UNITED STATES PATENT OFFICE.

MARC DARRIN, OF WILKINSBURG, PENNSYLVANIA, ASSIGNOR TO THE KOPPERS COMPANY, OF PITTSBURGH, PENNSYLVANIA, A CORPORATION OF PENNSYLVANIA.

PAINT OR VARNISH AND METHOD OF MAKING THE SAME.

1,315,658.      Specification of Letters Patent.     Patented Sept. 9, 1919.

No Drawing.     Application filed January 18, 1919. Serial No. 271,900.

*To all whom it may concern:*

Be it known that I, MARC DARRIN, residing at Wilkinsburg, in the county of Allegheny and State of Pennsylvania, have invented a new and useful Improvement in Paints or Varnishes and Methods of Making the Same, of which the following is a full, clear, and exact description.

My invention relates to paints and varnishes, and is designed to provide a valuable product of this character having as an important ingredient therein certain resin products resulting from the recovery of light oil from gas made from coal, coke, lignite, shale or petroleum.

For example, in obtaining benzol from by-product coke ovens, the gases from the coke ovens are passed through a tower where the benzol hydrocarbons are absorbed in heavy petroleum oil. This petroleum oil is then taken off and distilled to obtain hydrocarbons in the form of an oil, technically known as "light oil." This light oil is then distilled to obtain the benzol content and other constituents, such as toluol and solvent naphtha. This distillation of the light oil produces residues from which valuable resins are recoverable. I refer particularly to resins produced in the manner described in the patent of F. W. Sperr, Jr., and myself No. 1,263,813, and the resins produced by a process such as described in my Patent No. 1,236,917.

I have discovered that a paint or varnish possessing extraordinarily good chemical and electrical resisting properties can be made from resins of this character by combining them with certain oils, which I have found most suitable for this purpose. The oils which I have found most suitable for this purpose are known commercially as China wood oil, linseed oil, soy bean oil, poppy seed oil, perilla oil, corn oil, etc. These oils may be employed either in a raw condition or after boiling or other treatment. They may also be previously rendered heavy boiled by oxidation or otherwise.

As an example, a preferred method of preparing my new product consists in heating a quantity of the above described resins with one or more of the oils above mentioned to a temperature of approximately 350 degrees F., if the oil has already been previously boiled. If the oil has not been previously boiled, it is preferable to heat the material up to from 450 to 570 degrees F., in a manner to effect a proper thickening and combination of the materials. In such case, it is also advisable to add ordinary driers, such as litharge, prior to or during the cooking process. The charge should be maintained at the above temperature or thereabouts until the material becomes as viscous as possible, without danger of its gelatinizing or darkening. Of course, the oils and resins may be melted and cooked separately, being combined later at the lower temperature mentioned. This procedure, however, is not always as advantageous as that above described, particularly if China wood oil be used, as the latter does not show as much tendency to gelatinize or decompose when heated with the resins, especially at relatively high kettle temperature.

After the above described treatment is completed, the material is cooled and is thinned with any ordinary thinner, such as turpentine, turpentine substitutes, petroleum distillates, texico spirits, naphtha, benzol, benzin, toluene, or the like.

To give a more specific example, I may state that I have obtained an excellent varnish by using the following proportions:

Resin as obtained in the manner described in said Patent 1,236,813, 250 parts by weight; China wood oil, 650 parts by weight; litharge, 20 parts by weight; turpentine, 2000 parts by weight.

These proportions, however, may be very greatly varied and I do not desire to limit myself in any way to them, it being possible to produce varnishes for different purposes under a considerable variation in these proportions.

Linseed or other of the oils above mentioned can be substituted in part or completely for the China wood oil with good results. In fact, for many purposes, I find it advisable to add about 100 parts of linseed oil to the above proportions immediately after the cooking process with the China wood oil, and then continue the cooking for a short period.

Varnishes or paints made in this manner or containing the described materials as a part of their general composition are very tough and hard. The dried films resulting from their use are particularly resistant to electrical action. They are also entirely unaffected by hot moist fumes or by corroding gases or by chemical action of any description, except that of the very strongest mineral acids, such as nitric acid. Strong alkalis have practically no effect on the surfaces coated with this composition. In fact, it is comparable in its inertness to paraffins, being neither acidic nor basic in its properties.

Such paint or varnish is very suitable for the addition of delicate colorings, dyes, pigments, etc., because of its chemical inertness which in no way affects or modifies the most delicate shades.

I do not limit myself to the production of the product in the manner described.

I claim:

1. A paint or varnish comprising a resin obtained from solvent naphtha subjected to an autoclave process and a paint or varnish oil.

2. A paint or varnish comprising a heat polymerized resin obtained from solvent naphtha combined with paint or varnish oil and a volatile solvent.

3. A paint or varnish comprising a resin obtained from solvent naphtha combined with a paint or varnish oil, a drier, and a volatile solvent.

4. A paint or varnish comprising a resin obtained from solvent naphtha combined with China wood oil, a drier and a volatile solvent.

5. In the manufacture of paints and varnishes, the improvement which consists in mixing a resin obtained from solvent naphtha with a paint or varnish oil, and subsequently heating the mixture to a temperature in the neighborhood of from 450 degrees F. to 570 degrees F.

6. In the manufacture of paints and varnishes, the improvement which consists in mixing a resin obtained from solvent naphtha with China wood oil, and subsequently heating the mixture to a temperature in the neighborhood of from 450 degrees F. to 570 degrees F.

In testimony whereof I have hereunto set my hand.

MARC DARRIN.